US008600976B2

(12) United States Patent
Cradick et al.

(10) Patent No.: US 8,600,976 B2
(45) Date of Patent: Dec. 3, 2013

(54) INVALIDATING STREAMS IN AN OPERATOR GRAPH

(75) Inventors: Ryan K. Cradick, Oronoco, MN (US); Michael D. Pfeifer, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/218,502

(22) Filed: Aug. 26, 2011

(65) Prior Publication Data

US 2013/0054538 A1   Feb. 28, 2013

(51) Int. Cl.
*G06F 7/00* (2006.01)

(52) U.S. Cl.
USPC ............................................. 707/716

(58) Field of Classification Search
None
See application file for complete search history.

(56) References Cited

U.S. PATENT DOCUMENTS

| 6,199,068 | B1 * | 3/2001 | Carpenter ..................... 1/1 |
| 2004/0025013 | A1 | 2/2004 | Parker et al. |
| 2007/0022218 | A1 | 1/2007 | Szolyga et al. |
| 2008/0235291 | A1 * | 9/2008 | Lahiri et al. ................. 707/201 |
| 2008/0267078 | A1 | 10/2008 | Farinacci et al. |
| 2009/0228429 | A1 * | 9/2009 | Diaconu et al. ............... 707/2 |

OTHER PUBLICATIONS

International Search Report and Written Opinion of the ISA dated Nov. 15, 2012—International Application No. PCT/IB2012/053375.

* cited by examiner

*Primary Examiner* — Robert Beausoliel, Jr.
*Assistant Examiner* — Nirav K Khakhar
(74) *Attorney, Agent, or Firm* — Patterson & Sheridan LLP (57) ABSTRACT

Techniques are disclosed for invalidating, at one or more processing elements, data streams containing data tuples. A plurality of tuples is received via a data stream, whereupon the data stream is determined to be invalid based on at least one tuple in the plurality of tuples. The data stream is then invalidated, and a message is issued that causes one or more data streams included in the stream-based computing system and related to the invalidated data stream to also be invalidated.

24 Claims, 5 Drawing Sheets

FIG. 5

INVALIDATING STREAMS IN AN OPERATOR GRAPH

BACKGROUND

Computer databases have become extremely sophisticated, e.g., the computing demands placed on database systems have increased at a rapid pace. Database systems are typically configured to separate the process of storing data from accessing, manipulating or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated, which, in turn, limits the utility of database applications configured to process large amounts of data in real-time.

To address this issue, stream based computing and stream based database computing is emerging as a developing technology for database systems, where products are available and allow users to create applications that process and query streaming data before it reaches a database file. With this emerging technology, users can specify processing logic to apply to inbound data records while they are "in flight," with the results available in milliseconds. Constructing an application using this type of processing has opened up a new programming paradigm that will allow for a broad variety of innovative applications, systems and processes to be developed as well as present new challenges for application programmers and database developers.

One or more data streams may be "looped back" across processing elements that operate on the one or more data streams. As a result, duplicate and/or similar data streams are generated and continue to be processed by the processing elements. In some cases, a processing element may determine that a particular data stream should no longer be processed, and the processing element terminates the data stream. Unfortunately, all data streams related to the particular data stream—which also should no longer be processed—continue to be processed by other processing elements. As a result, wasteful consumption of system resources occurs.

SUMMARY

One embodiment of the invention provides a technique for invalidating a data stream and one or more data streams related thereto. A data stream is received and is then invalidated based on at least one tuple received via the data stream. A message is then issued that causes one or more data streams included in the stream-based computing system and related to the invalidated data stream to also be invalidated.

Another embodiment of the invention provides a system that comprises a plurality of compute nodes, each comprising a processor and a memory, wherein the memory stores a manager which, when executed the compute node, is configured to invalidate one or more data streams. The operation comprises receiving a data stream, invalidating the data stream based on at least one tuple received via the data stream, and issuing a message that causes one or more data streams included in the stream-based computing system and related to the invalidated data stream to also be invalidated.

Further embodiments of the invention provide a non-transitory computer readable storage medium that includes instructions for causing a computer system carry out on or more of the methods set forth above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for invalidating a data stream and one or more data streams related thereto. A processing element may invalidate a given data stream based on receiving a certain tuple (or tuples) received via the data stream. When processing element invalidates a given data stream, it may also issue a message that causes one or more related data streams in the stream-based computing system to also be invalidated. As a result, wasteful consumption of processing and bandwidth resources is reduced.

In context of this disclosure, a data stream generally refers to a tuple (or tuples) flowing through a sequence of processing elements. Each processing element may generally receive a tuple (or tuples) and emit a tuple (or tuples) to other processing elements. The emitted tuples may be unchanged by the processing element, but new or modified tuples may be generated as well. Further, a processing element may replicate a tuple (or tuples) and send copies to multiple processing elements. That is, one processing element may create a branch in the stream where an outgoing tuples branch out downstream in multiple directions. In such a case, a processing element in one branch may determine that the data stream for a given tuple (or tuples) should be invalidated. That is, a processing element may determine that no further processing should be performed on the tuple. In such a case, that processing element may be configured to not emit any further tuples downstream due to the invalidated tuple. Further, in one embodiment, the processing element may notify other processing elements to not process (or discontinue processing) tuples related to the invalidated one. Such a notification may be sent to other processor elements directly, but could also be mediated by a stream manager.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
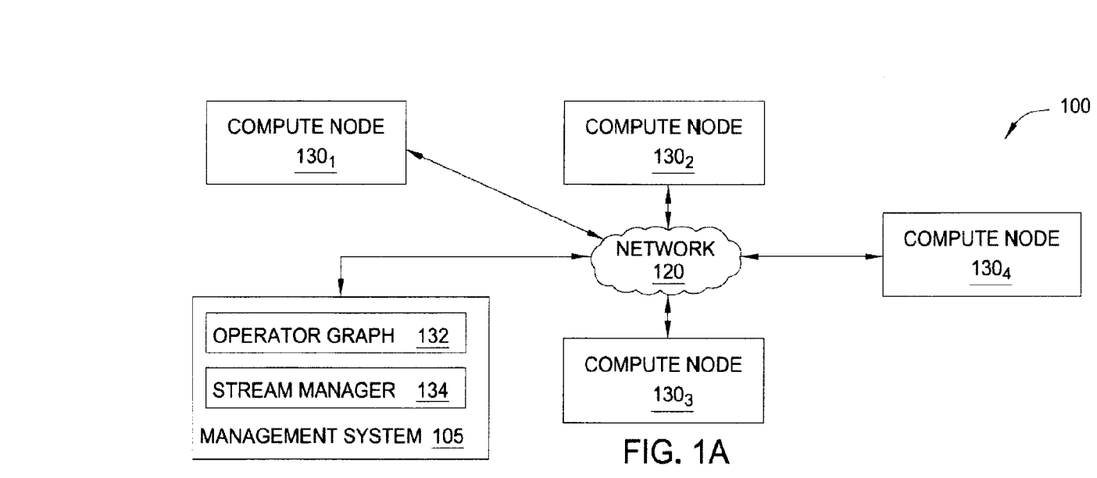
FIGS. 1A-1B illustrate a computing infrastructure configured to execute a stream database application, according to an embodiment of the invention.
Figure 1B:
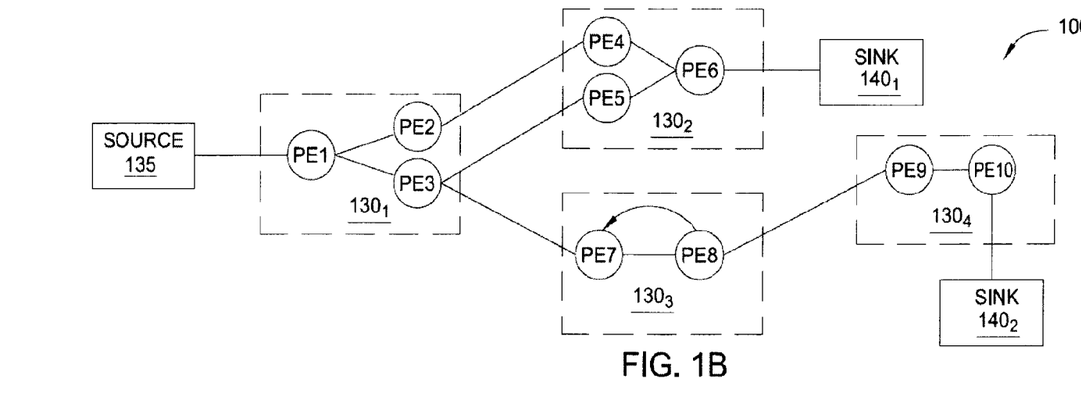

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. The operator graph 132 represents a stream application beginning from of one or more source processing elements (PEs) through to one or more sink PEs. Data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. And the processing elements could be configured to receive or emit data in formats other than an N-tuple (e.g., the processing elements could exchange data marked up as XML documents). Additionally, each processing element may be configured to carry out any form of data processing functions on the received tuple, including, e.g., writing to database tables or performing other database operations such as data joins, splits, reads, etc., as well as performing other data analytic functions or operations.

The stream manager 134 may be configured to monitor a stream application running on the compute nodes $130_{1-4}$ as well as change the structure of the operator graph 132. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

FIG. 1B illustrates an example operator graph that includes ten processing elements (labeled as PE1-PE10) running on the compute nodes $130_{1-4}$. While a processing element may be executed as an independently running process (with its own process ID (PID) and memory space), multiple processing elements may be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at PE1, which reads from source 135 and ends at PE6 and PE10, which both write to sink $140_{1-2}$. Compute node $130_1$ includes source PE1 along with PE2 and PE3. Source PE1 emits tuples received by PE2 and PE3. For example, PE1 may split data elements received in a tuple and pass some data elements to PE2 others to PE3. Data that flows to PE2 results in tuples emitted to PE4 on compute node $130_2$. And data tuples emitted by PE4 flow to sink PE6, which writes to sink $140_1$. Similarly, data tuples flowing from PE3 to PE5 also reach sink PE6, which writes to sink $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which emits tuples processed by sink PE10, which writes to sink $140_2$.

Figure 2:
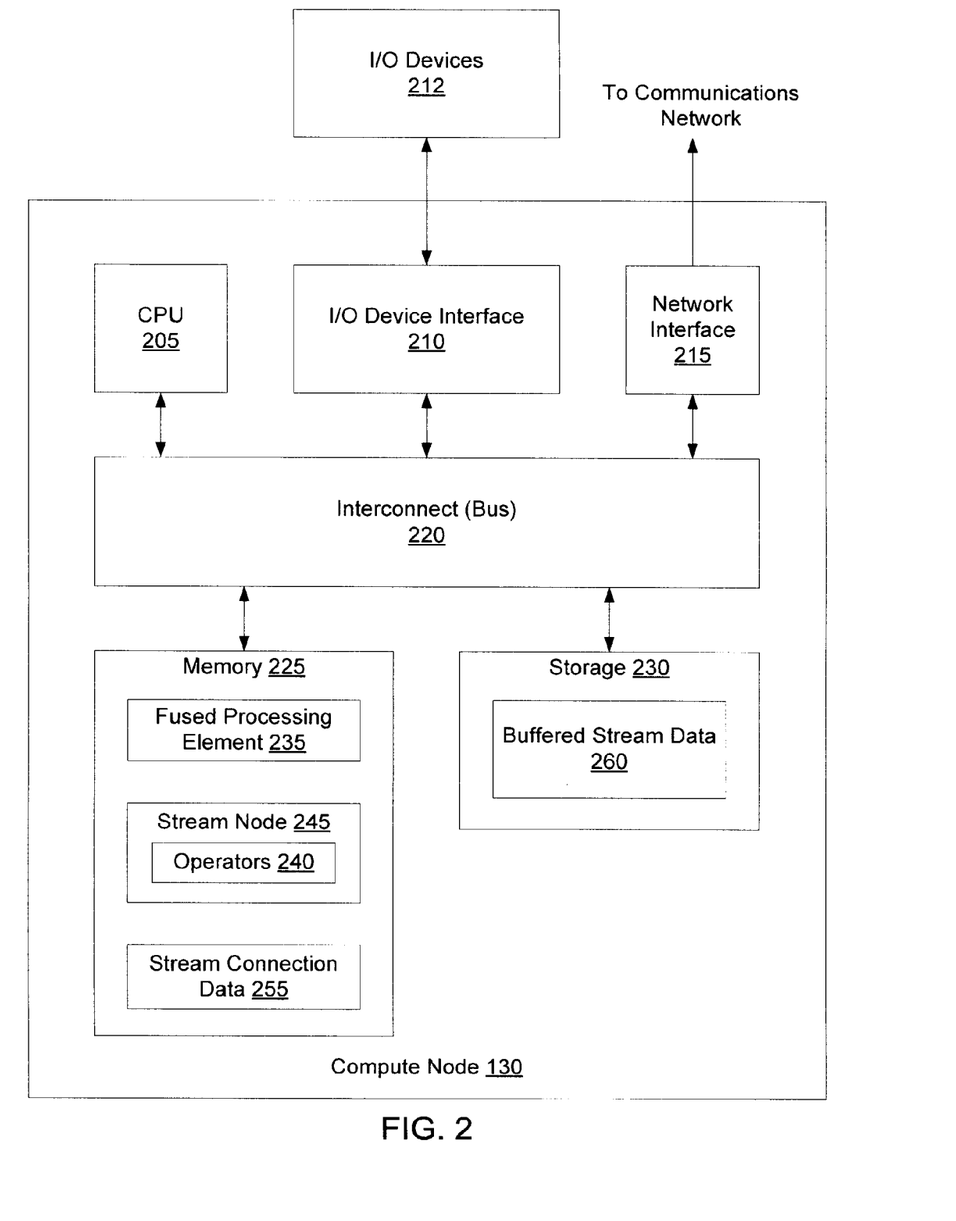
FIG. 2 illustrates a compute node, according to an embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a fused processing element (PE) 235, a stream node 245 and stream connection data 255. The stream node 245 includes a collection of operators 240. Each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessed over the data communications network 120.

Buffered stream data 260 represents a storage space for data flowing into the compute node 105 from upstream processing elements (or from a data source for the stream application). For example, buffered stream data may include data tuples waiting to be processed by a processing element, such as PE 235. Buffered stream data 260 may also store the results of data processing performed by PE 235 that will be sent to downstream processing elements (or load shed at downstream processing elements).

Figure 3:
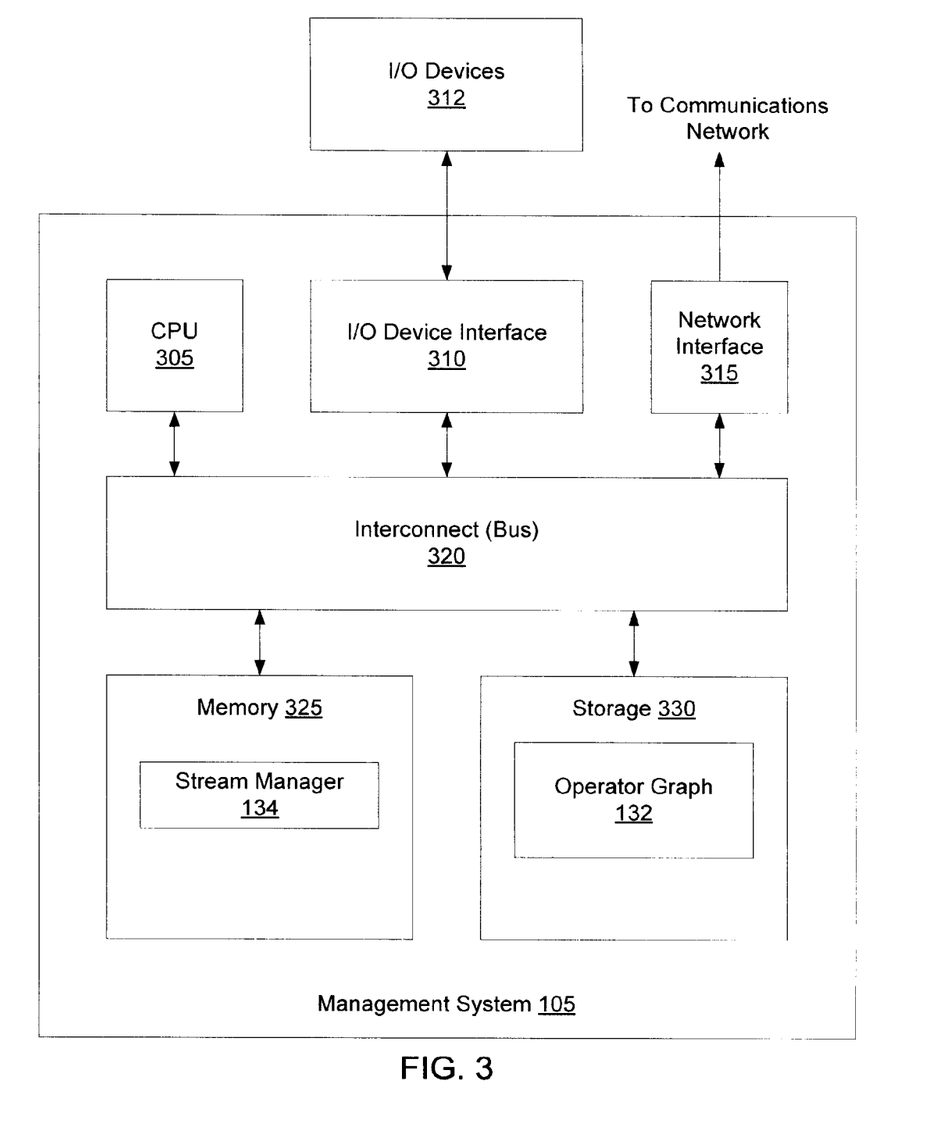
FIG. 3 illustrates a management system, according to an embodiment of the invention.

FIG. 3 is a more detailed view of the management system 105 of FIG. 1, according to one embodiment of the invention.

As shown, management system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display, and mouse devices) to the management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. The storage 330 includes an operator graph 132. The operator graph 132 represents a stream application beginning from of one or more source processing elements (PEs) through to one or more sink PEs. In one embodiment, the stream manager 134 monitors a stream application running on the compute nodes $130_{1-4}$ and changes the structure of the operator graph 132 as needed. For example, the stream manager 134 may move processing elements (PEs) from one compute node 130 to another, e.g., to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$.

Figure 4:
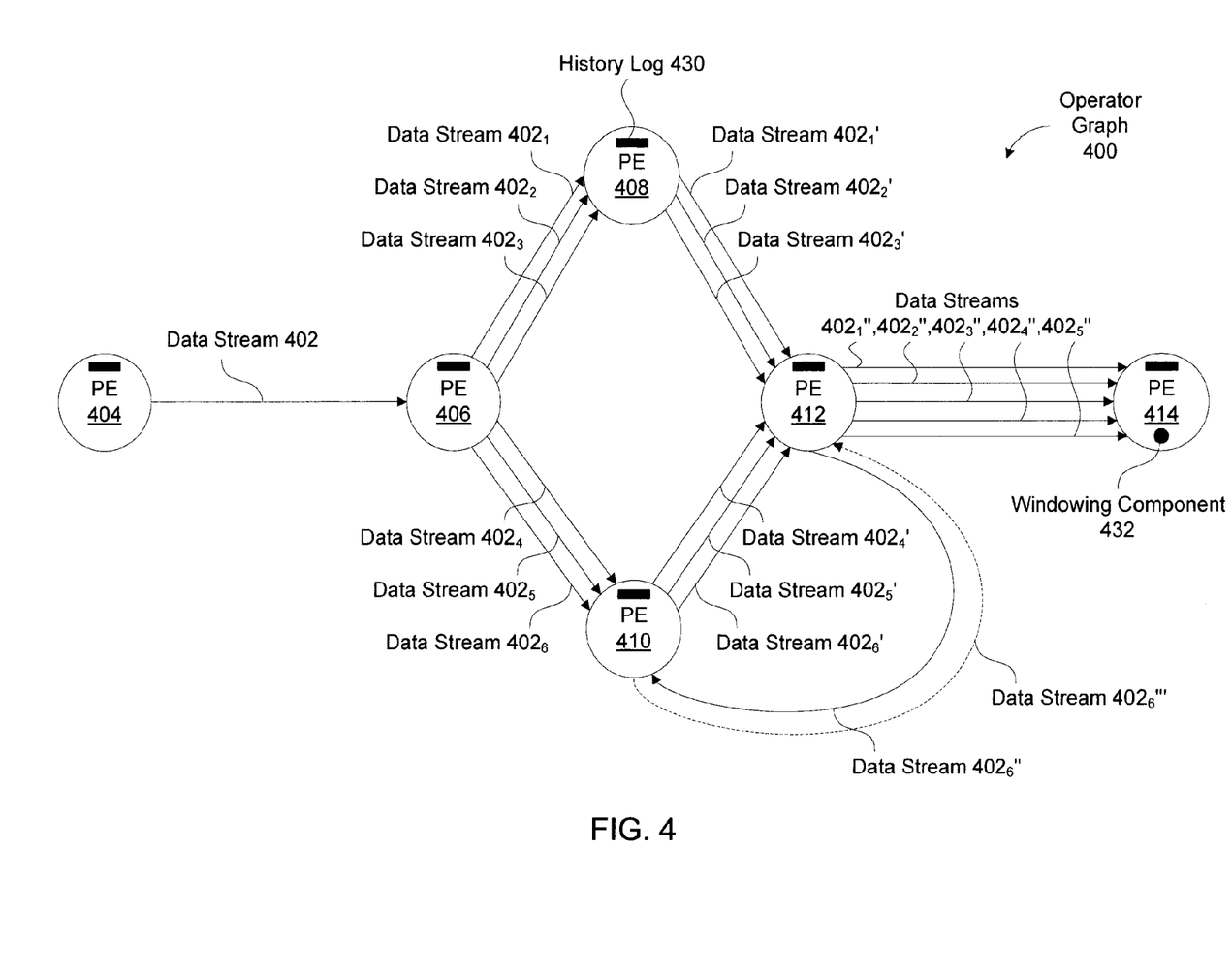
FIG. 4 illustrates an operator graph in which a data stream and one or more data streams related thereto are invalidated, according to an embodiment of the invention.

FIG. 4 illustrates an operator graph in which a data stream and one or more related data streams are invalidated, according to an embodiment of the invention. As shown, data stream 402 flows from PE 404 to PE 406, where PE 406 creates six copies of data stream 402, i.e., data stream $402_1$, data stream $402_2$, data stream $402_3$, data stream $402_4$, data stream $402_5$ and data stream $402_6$. As also shown, three data streams $402_{1-3}$ flow from PE 406 to PE 408 for processing, while the other three data streams $402_{4-6}$ flow from PE 406 to PE 410 for processing.

When PE 408 and PE 410 process data streams $402_{1-3}$ and data streams $402_{4-6}$, respectively, they are output as data streams $402_{1-3}'$ and data streams $402_{4-6}'$ and forwarded to PE 412 for further processing. When PE 412 processes data streams $402_{1-6}'$, they are output as data streams $402_{1-6}''$, where data streams $402_{1-5}''$ are forwarded to PE 414, and data stream $402_6''$ is "looped back" to PE 410 for additional processing by PE 410, where PE 410 may optionally output data stream $402_6'''$ to PE 412.

At a particular point in time, a PE included in operator graph 400 may determine that any portion of a data stream 402, e.g., data stream $402_6''$ to be invalid. This determination may occur based on a variety of conditions, e.g., the data stream may require too much processing time and therefore reaches an expiration timestamp associated therewith. As another example, one processing element may determine that data for a set of tuples flowing through the data stream is invalid for one reason or another. For example, assume that the data stream evaluates medical test results as part of a research study and that one of the PEs determines whether a submitted test reflected in tuple data satisfies data quality requirements for the research study. If the data quality processing element invalidates a given test result, it may notify other processing elements to discontinue (or disregard) tuples associated with the invalidated test results. That is, the data quality processing element may invalidate other, related data streams.

Relative to FIG. 4, e.g., when, PE 410 invalidates a given tuple, PE 410 may notify one or more PEs included in operator graph 400 to also invalidate data streams 402 that are related to data stream $402_6''$, e.g., any of data streams $402_{1-5}''$. Determining relationships between data streams may be performed according to a variety of techniques. In one example, two data streams may be related based on shared attributes across tuples that are included therein. In another example, data streams may be related based on sharing the same source, e.g., data streams $402_{1-6}$ are related in that they are generated at PE 406 from a particular input tuple (or tuples). The resulting tuples emitted by PE 406, as data streams $402_{1-6}$ all share the common history.

PE 410 may notify the one or more PEs according to a variety of techniques. In one example, PE 410 may issue the invalidation message only to specific PEs or sets of PEs (not illustrated) that are included in operator graph 400. For example, PE 404 and PE 406 may belong to a first set of PEs such that PE 410 need only issue the invalidation message as a multicast message to the first set of PEs, which is more efficient than issuing separate messages to each of PE 404 and PE 406.

As another example, PE 410 may issue the invalidation message only to PEs that lie upstream and/or downstream in operator graph 400. For example, if PE 408 determines that only upstream PEs should invalidate related data streams 402, then only PE 404 and PE 406 would perform an invalidation of related data streams 402. Alternatively, if PE 408 determines that only downstream PEs should invalidate related data streams 402, then only PE 412 and PE 414 would perform an invalidation of related data streams 402.

In another example, PE 410 may issue the invalidation message only to PEs that are included in a particular compute node (not illustrated), or a set of compute nodes (not illustrated). For example, PEs 404 and 406 may be executing on a first compute node, PEs 408, 410 and 412 may be executing on a second compute node, and PE 414 may be executing on a third compute node. In this example, PE 410 may issue the invalidation message only to the third compute node such that PE 414 is the only PE aside from PE 410 that performs an invalidation of one or more related data streams 402.

In another example, PE 410 may issue an invalidation message that causes only PEs with a history log 430 that satisfies a particular criterion to invalidate data streams 402. Here, history log 430 may be configured to log, at any level of detail, the processing activity of the PE in which it is included. For example, PE 408 may be configured to maintain a record of the last one hundred tuples that were received and processed by PE 408. Accordingly, the invalidation message could include an invalidation criterion that, e.g., specifies that only PEs that have processed fifty or more tuples included in a related data stream 402 should invalidate the related data stream 402.

In yet another example, PE 410 may issue an invalidation message only to PEs that act as a windowing component, e.g., PE 414. Here, PE 414 is configured to aggregate tuples received via one or more data streams. The aggregation may be performed according to a variety of techniques including, e.g., summating an attribute of the last one hundred tuples received at PE 414, summating an attribute of all tuples received in the last two minutes received at PE 414, joining a particular number tuples received at PE 414, and the like.

Figure 5:
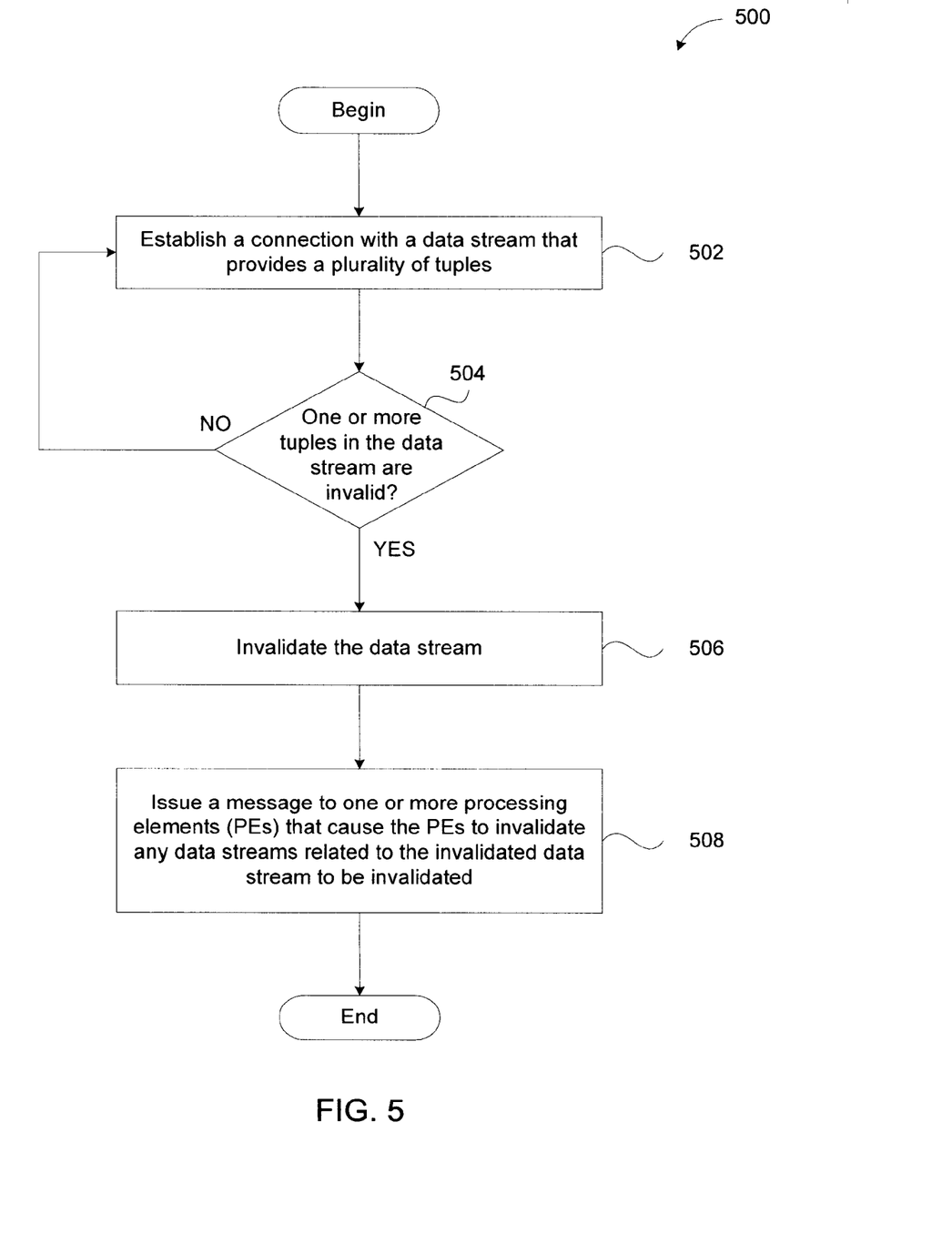
FIG. 5 illustrates a method for invalidating one or more data streams, according to an embodiment of the invention.

FIG. 5 is a flowchart of a method 500 for invalidating one or more data streams, according to an embodiment of the invention. In one embodiment, the method steps 500 are performed by a PE included in a compute node (i.e., the compute node 130). In an alternative embodiment, the management system 105 may be configured to perform the method steps 500. As shown, the method 500 begins at step 502, where a PE—such as the PE 410—establishes a connection with a data stream that provides a plurality of tuples. In one example, with reference to FIG. 4, PE 410 establishes a connection with PE 406 and PE 412 to receive data streams 402$_{4-6}$ and data stream 406$_6$", respectively.

At step 504, PE 410 determines whether one or more tuples in the data stream are invalid according to the techniques described above in conjunction with FIG. 4. If, at step 504, PE 410 determines that one or more tuples in the data stream are invalid, then the method 500 proceeds to step 506. Otherwise, PE 410 continues to process the data stream until an invalidation of one or more tuples occurs.

At step 506, PE 410 invalidates the data stream, where the data in the data stream is eliminated. At step 508, PE 410 issues a message to one or more PEs that case the PEs to invalidate any data streams related to the invalidated data stream to be invalidated. This message may be issued according to the techniques described above in conjunction with FIG. 4 such that the invalidation of related data streams occurs in a controlled manner.

Advantageously, embodiments of the invention described above provide techniques for invalidating data streams in a stream application. In particular, embodiments of the invention provide techniques for invalidating data streams based at least the compute nodes, processing elements, history components and/or windowing components that operate on the data streams. As a result, wasteful consumption of processing and bandwidth resources is reduced.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing a plurality of processing elements comprising one or more operators, the operators configured to process streaming data tuples by operation of one or more computer processors;
establishing an operator graph of a plurality of operators, the operator graph defining at least one execution path in which a first operator of the plurality of operators is configured to: (i) receive data tuples from at least one upstream operator and (ii) transmit data tuples to at least one downstream operator;
receiving, at a first processing element of the plurality of processing elements, one or more data tuples associated with a first data stream;
invalidating the first data stream based on at least one attribute of the data tuples received via the first data stream; and
issuing, by the first processing element, a message received by at least a second processing element that causes at least a second data stream in addition to the first data stream to be invalidated, wherein the second data stream comprises at least one of: (i) a subset of the data tuples of the first data stream processed by the first processing element and received by the second processing element, and (ii) a subset of the data tuples of the first data stream processed by a processing element upstream from the first processing element.

2. The method of claim 1, wherein invalidating the first data stream and invalidating the second data stream comprises removing from the stream-based computing system all data tuples received via the first data stream and all data tuples received via the second data stream, wherein the at least one attribute of the data tuples is identified by an application configured to individually identify each attribute selected from: (i) an expiration time of the data tuples, (ii) a data quality of the data tuples, (iii) a processing time of the data tuples, and (iv) a value of the data tuples.

3. The method of claim 1, wherein the at least the second data stream is determined to be related to the first data stream based on an attribute shared between the one or more data tuples of the first data stream and the data tuples received via the at least a second data stream.

4. The method of claim 1, wherein the message is issued to, in respective instances, each of: (i) a subset of processing elements executing on a specified compute node, (ii) a subset of processing elements upstream from the first processing element, (iii) a subset of processing elements downstream from the first processing element, and (iv) all processing elements in the stream-based computing system.

5. The method of claim 1, wherein only related data streams being processed by one or more compute nodes or one or more sets of compute nodes are invalidated.

6. The method of claim 1, wherein only related data streams being processed by one or more individual processing elements or one or more sets of processing elements are invalidated, wherein the first and second processing elements execute on different compute nodes.

7. The method of claim 1, wherein the at least a second processing element includes a processing log, wherein the data tuples of the second data stream are invalidated upon determining that at least one attribute of the data tuples of the second data stream matches a criteria specified in the processing log.

8. The method of claim 1, wherein the at least a second processing element includes a windowing component that performs an aggregation of the at least a second data stream.

9. A computer-readable storage medium storing an application, which, when executed on a processor, performs a process, comprising:
  providing a plurality of processing elements comprising one or more operators, the operators configured to process streaming data tuples by operation of one or more computer processors;
  establishing an operator graph of a plurality of operators, the operator graph defining at least one execution path in which a first operator of the plurality of operators is configured to: (i) receive data tuples from at least one upstream operator and (ii) transmit data tuples to at least one downstream operator;
  receiving, at a first processing element of the plurality of processing elements, one or more data tuples associated with a first data stream;
  invalidating the first data stream based on at least one attribute of the data tuples received via the first data stream; and
  issuing, by the first processing element, a message received by at least a second processing element that causes at least a second data stream in addition to the first data stream to be invalidated, wherein the second data stream comprises at least one of: (i) a subset of the data tuples of the first data stream processed by the first processing element and received by the second processing element, and (ii) a subset of the data tuples of the first data stream processed by a processing element upstream from the first processing element.

10. The computer-readable storage medium of claim 9, wherein invalidating the first data stream and invalidating the second data stream comprises removing from the stream-based computing system all data tuples received via the first data stream and all data tuples received via the second data stream, wherein the at least one attribute of the data tuples is identified by an application configured to individually identify each attribute selected from: (i) an expiration time of the data tuples, (ii) a data quality of the data tuples, (iii) a processing time of the data tuples, and (iv) a value of the data tuples.

11. The computer-readable storage medium of claim 9, wherein the at least the second data stream is determined to be related to the first data stream based on an attribute shared between the one or more data tuples of the first data stream and the data tuples received via the at least a second data stream.

12. The computer-readable storage medium of claim 9, wherein the message is issued to, in respective instances, each of: (i) a subset of processing elements executing on a specified compute node, (ii) a subset of processing elements upstream from the first processing element, (iii) a subset of processing elements downstream from the first processing element, and (iv) all processing elements in the stream-based computing system.

13. The computer-readable storage medium of claim 9, wherein only related data streams being processed by one or more compute nodes or one or more sets of compute nodes are invalidated.

14. The computer-readable storage medium of claim 9, wherein only related data streams being processed by one or more individual processing elements or one or more sets of processing elements are invalidated, wherein the first and second processing elements execute on different compute nodes.

15. The computer-readable storage medium of claim 9, wherein the at least a second processing element includes a processing log, wherein the data tuples of the second data stream are invalidated upon determining that at least one attribute of the data tuples of the second data stream matches a criteria specified in the processing log.

16. The computer-readable storage medium of claim 9, wherein the at least a second processing element includes a windowing component that performs an aggregation of the at least a second data stream.

17. A system, comprising:
  one or more computer processors; and
  a memory containing a program, which when executed by the one or more computer processors performs an operation, the operation comprising:
  providing a plurality of processing elements comprising one or more operators, the operators configured to process streaming data tuples by operation of one or more computer processors;
  establishing an operator graph of a plurality of operators, the operator graph defining at least one execution path in which a first operator of the plurality of operators is configured to: (i) receive data tuples from at least one upstream operator and (ii) transmit data tuples to at least one downstream operator;
  receiving, at a first processing element of the plurality of processing elements, one or more data tuples associated with a first data stream;
  invalidating the first data stream based on at least one attribute of the data tuples received via the first data stream; and
  issuing, by the first processing element, a message received by at least a second processing element that causes at least a second data stream in addition to the first data stream to be invalidated, wherein the second data stream comprises at least one of: (i) a subset of the data tuples of the first data stream processed by the first processing element and received by the second processing element, and (ii) a subset of the data tuples of the first data stream processed by a processing element upstream from the first processing element.

18. The system of claim 17, wherein invalidating the first data stream and invalidating the second data stream comprises removing from the system all data tuples received via the first data stream and all data tuples received via the second data stream, wherein the at least one attribute of the data tuples is identified by an application configured to individually identify each attribute selected from: (i) an expiration time of the data tuples, (ii) a data quality of the data tuples, (iii) a processing time of the data tuples, and (iv) a value of the data tuples.

19. The system of claim 17, wherein the at least the second data stream is determined to be related to the first data stream based on an attribute shared between the one or more data tuples of the first data stream and the data tuples received via the at least a second data stream.

20. The system of claim 17, wherein the message is issued to, in respective instances, each of: (i) a subset of processing elements executing on a specified compute node, (ii) a subset of processing elements upstream from the first processing element, (iii) a subset of processing elements downstream from the first processing element, and (iv) all processing elements in the stream-based computing system.

21. The system of claim 17, wherein only related data streams being processed by one or more individual compute nodes or one or more sets of compute nodes are invalidated.

22. The system of claim 17, wherein only related data streams being processed by one or more individual processing elements or one or more sets of processing elements are invalidated, and wherein each of the processing elements is executing on different compute nodes.

23. The system of claim 17, wherein the at least a second processing element includes a processing log, wherein the data tuples of the second data stream are invalidated upon determining that at least one attribute of the data tuples of the second data stream matches a criteria specified in the processing log.

24. The system of claim 17, wherein the at least a second processing element includes a windowing component that performs an aggregation of the at least a second data stream.

* * * * *